June 30, 1931.  L. G. GATES  1,812,091
NONKICKING BRAKE APPARATUS
Filed July 14, 1926  2 Sheets-Sheet 1
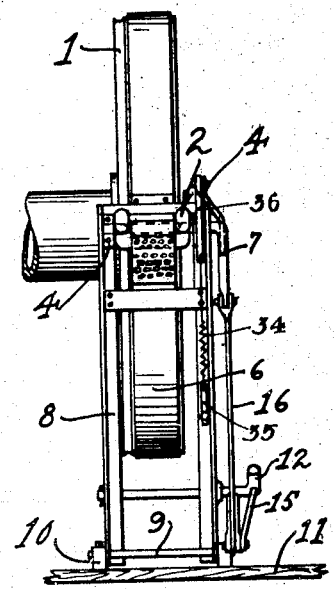
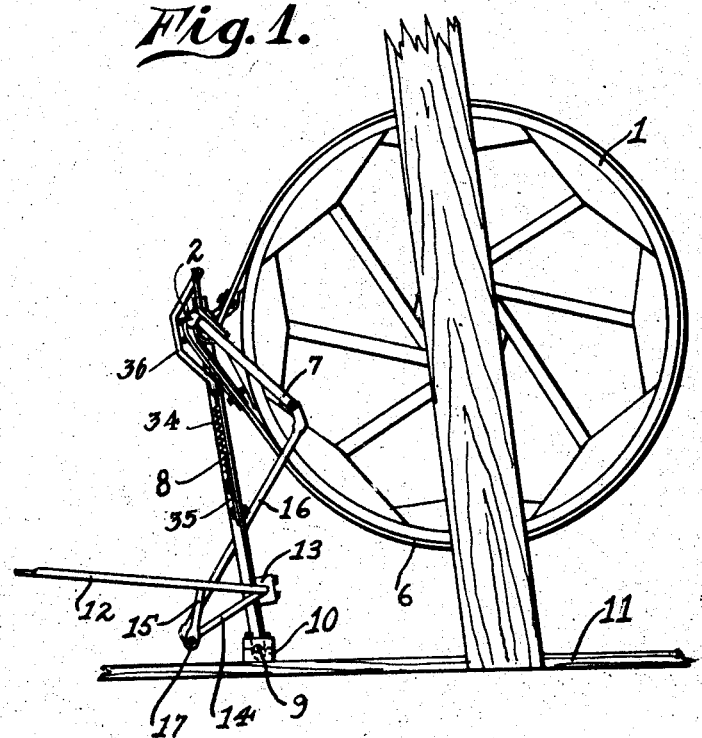
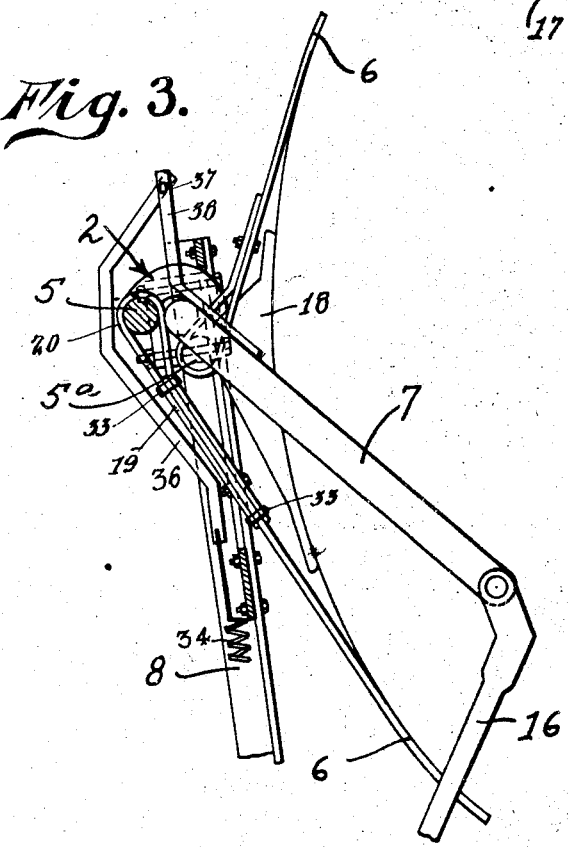
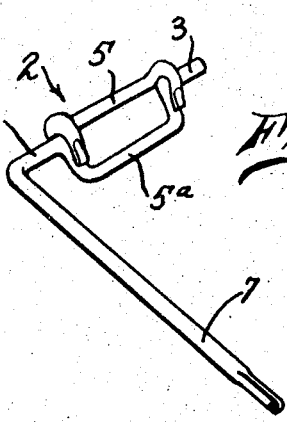
Inventor
Leroy G. Gates
By Lyon & Lyon
Attorneys Patented June 30, 1931

1,812,091

UNITED STATES PATENT OFFICE

LEROY G. GATES, OF BAKERSFIELD, CALIFORNIA, ASSIGNOR TO STANDARD OIL COMPANY OF CALIFORNIA, OF SAN FRANCISCO, CALIFORNIA, A CORPORATION OF CALIFORNIA

NONKICKING BRAKE APPARATUS

Application filed July 14, 1926. Serial No. 122,339.

This invention relates to brake apparatus, and while the features of the invention are applicable to brake apparatus for any purpose, the invention is particularly useful when applied to calf wheels, such as used in oil well apparatus for raising and lowering casings. The brake for such a wheel is usually in the form of a band with one end anchored or held in a substantially fixed position and with the other end mounted as a "live" end and connected with a lever to tighten the band on the wheel. With a brake of that type, if the direction of rotation of the calf wheel suddenly reverses, the brake lever may give a "kick-back" with great force, and in this way serious accidents sometimes occur. Furthermore, in the operation of calf wheels it sometimes happens that the bearings become greatly worn, and even to such an extent that the calf wheel may suddenly shift its true axis of rotation. When this occurs it throws a great strain on the brake band and throws the center of the wheel out of line with the center of the brake band.

The general object of this invention is to overcome these difficulties and produce a brake apparatus having a mode of operation such that there will be no back-kick in the brake lever in case the calf wheel suddenly reverses its direction of rotation. A further object is to provide a construction for the brake apparatus which will enable it to adapt itself to a laterally shifted position of the calf wheel; and also to provide means whereby the ratio of tightening movement of the brake band is relatively high when the brake is loose, and relatively low at or about the time the brake becomes tight on the wheel, thereby increasing the power lever or "purchase" when the braking force is being applied to the wheel.

A further object of the invention is to provide simple means for effecting adjustments in the length of the brake band.

Further objects of the invention will appear hereinafter.

The invention consists in the novel parts and combination of parts to be described hereinafter, all of which contribute to produce an efficient non-kicking brake apparatus.

A preferred embodiment of the invention is described in the following specification, while the broad scope of the invention is pointed out in the appended claims.

In the drawings:

Figure 1 is a side elevation of a brake apparatus and a calf wheel to which the same is applied, a portion of the derrick carrying the calf wheel being represented and broken away.

Figure 2 is a front elevation of the brake apparatus shown in Fig. 1, and showing a portion of the calf wheel drum broken away.

Figure 3 is a view upon an enlarged scale, particularly illustrating the brake tightener and the details of the construction of the parts in its vicinity. This view is shown partly in section.

Figure 4 is a perspective of the belt tightener representing the same removed from its supports.

Figure 5:
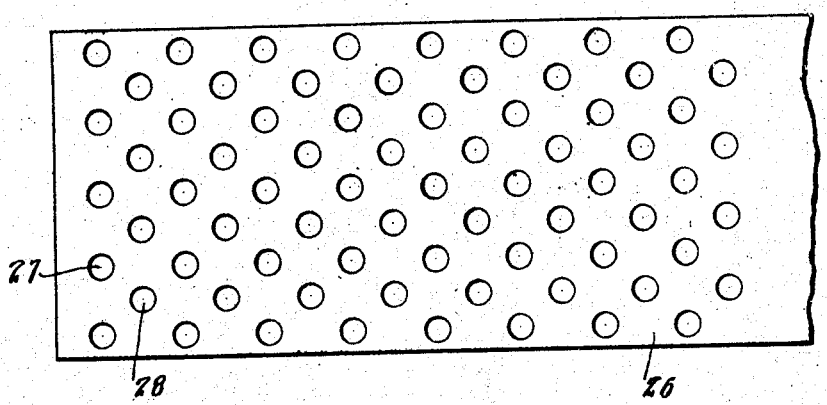
Figure 5 is a plan of the end of the brake band, broken away.

In practicing the invention, I provide a brake member to frictionally engage the wheel or the like to which the brake is applied, and I also provide a tightener having two points of attachment with the ends of the brake member; this tightener is constructed and mounted so that when it is moved, both ends of the brake member are moved. On account of this organization of parts, both ends of the brake member are "live" ends and the pull of the brake member at each end will tend to produce a movement of the tightener in the same direction.

Of course with one direction of rotation the pull of the brake member will be exerted on one point of attachment due to the frictional pull of the wheel, and for the other direction of rotation of the wheel, the pull will be exerted upon the other point of attachment. With this organization of parts, if the direction of rotation of the calf wheel is suddenly reversed, the principal pull will be shifted from one of the ends of the brake member to the other, but this does not change the direction of the torque or rotating moment on the brake tightener.

In order to accomplish this effect in applying the invention to a calf wheel 1, such as illustrated in Fig. 1, I provide a tightener 2 (see Fig. 4). This tightener is mounted to rock on a relatively fixed axis. For this purpose it is formed with a spindle having two journals 3 supported in suitable bearings 4. This tightener has two points of connection to the brake member, that is to say, it is provided with two crank arms having two wrists or wrist pins 5, 5a. These pins are not diametrically opposite to each other, but they are located so that the angle between the crank arms of the pins is about equal to the angle between the ends of the brake bands, and form an obtuse angle with each other, (see Fig. 3). In the present instance, the radius line from the axis of the spindle 3 of the tightener to the point of attachment of one end of the brake band makes an obtuse angle with the radius line from the axis of the spindle 3 to the other point of attachment at the other end of the brake band. In the present instance, the brake member is in the form of a brake band 6 wrapped around the calf wheel, one end of the same being attached to the wrist 5 and the other end being attached to the wrist 5a. The ends of the band 6 extend beyond the axis of rotation of the tightener 2. It will be noted that these wrists 5 and 5a are disposed on opposite sides of the axis of rotation of the tightener, that is to say, the axis of the necks 3. The tightener also includes an operating arm or lever 7. If this lever is pulled downwardly, it will be evident that the wrist 5a will move down and the wrist 5 will move up, and this will take up and tighten both ends of the band, giving a substantially equal "take-up" for each wrist pin, each pin moving so as to pull its end of the band along the line in which the end of the band extends, that is to say, along a line substantially tangential to the arc of the wheel. By making the "take-up" the same for both brake ends, there will be no "kick" force. I prefer to mount the tightener so as to enable it to adapt its position to any lateral shifting of the axis of rotation of the calf wheel. For this purpose, I prefer to mount the tightener on a floating support or post 8 which may have its lower end constructed with a pivot 9 mounted in a bearing 10 on the floor 11 of the derrick.

The brake lever which actuates the arm 7 may also be mounted on a fixed support, but I prefer to provide a brake lever 12, as shown in Fig. 1, mounted on a bearing 13 secured to the side of the floating support or post 8. This brake lever 12 has a short arm 14 which is preferably braced at its end by a strut brace 15. Between the brake lever 12 and the arm 7, a connection is provided such that when the brake band 6 is loose, the tightener 2 will be moved at a relatively high ratio, but on the other hand, when the band commences to tighten, this ratio of movement will be relatively small. In this way, when the brake lever is operated, the slack of the band will be quickly taken up, and after it is taken up, a relatively high power arm or "purchase" is maintained when the belt is being tightened on the the wheel, that is to say, there is a relatively long "lever arm" for the lever 12 in applying the brake band to the wheel. This makes the brake relatively powerful and at the same time, by reason of the fact that any reversal of movement of the calf wheel will transform the pulling stress on one wrist pin to a substantially equal pulling force on the other wrist-pin, there will be no reversal or substantial change in the amount of the force acting in the levers, the brake apparatus will be "non-kicking".

In this connection, it should be noted that when the brake lever 12 is in the position which will tighten the brake band, the short arm 14 of this lever will project away from the location of the tightener. The lower end of this short arm is connected by a suitable pivotal connection with a link 16 which attaches at its upper end to the arm 7. In this position, the direction of pull in the link 6 is substantially at right angles to the longitudinal axis of the arm 7, and this gives a relatively long lever arm at this point. Furthermore, in this position of the short arm 14, its pivot pin 17 which connects it to the link 16 will be moving downwardly toward a position below the bearing 13, and this gives a relatively short distance between the axis of the bearing 13 and the link 16; in other words, a short arm is developed at this end of the link and this increases the relative leverage for a force applied to the end of the brake lever or foot lever 12.

It will be evident also that if the calf wheel should shift in its bearing in a lateral direction, the brake band will "follow" or stay with the wheel because the floating support or post 8 will simply swing laterally to accommodate the band to the new position of the wheel. Hence if the bearings for the calf-wheel should become worn to such an extent that the wheel would "jump" laterally, the brake band and the part 8 will swing back or forth with the wheel. If desired a brake-shoe in the form of a block 18 may be secured to the inner end of the brake-band. This shoe has a socket in its outer face receiving the wrist 5ª, presses against the face of the calf-wheel and assists in developing friction on the wheel when the brake is applied. It also holds the ends of the brake band away from the face of the wheel.

Figure 6:
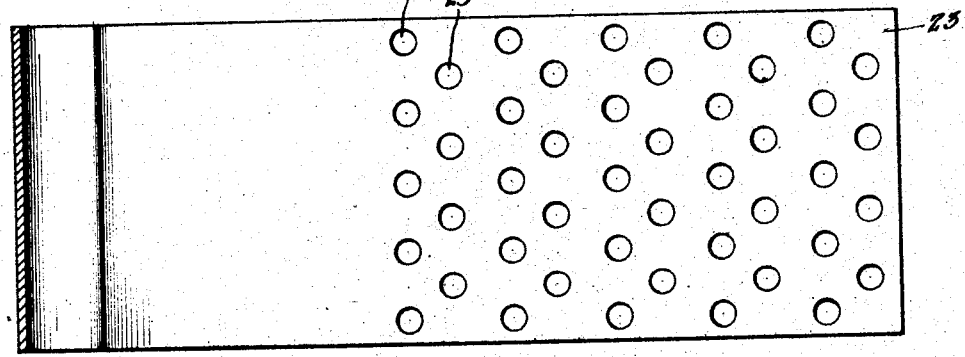
Figure 6 is a section through the pin-strap.
Figure 7:
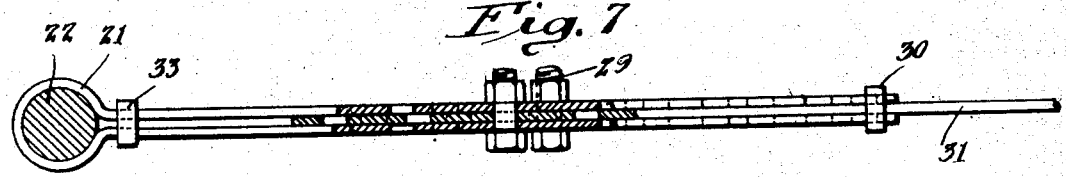
Figure 7 is a side elevation of the end of the brake band with the pin strap attached to it, broken away and shown partially in section with the pin to which the eye of the strip is attached.

With the brake apparatus described above it is necessary that the length of the band be nicely adjusted. In order to accomplish this in a simple way and without greatly reducing the strength of the band, I prefer to provide a pin-strap 19 which has an eye 20 to engage over the pin 5 (see Figure 3). In Figures 5 to 7 I illustrate the details of such a pin-strap with my adjusting means. However in Figure 7 the eye 21 of this pin-strap is made to conform more closely to the contour of its pin 22 than the pin strap illustrated in Figure 3.

Figure 8:
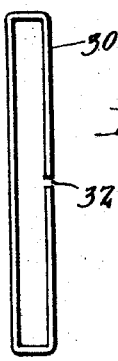
Figure 8 is a side elevation of a clip for holding the ends of the pin-strap against the end of the brake band.

In order to provide the desired adjustment, the two leaves 23 of the pin-strap are provided with transverse rows 24 and 25 of bolt-holes. The holes in these rows are disposed in staggered relation. In the end 26 of the brake band illustrated in Figure 5, similar rows 27 and 28 of bolt-holes are provided, and these holes are in the same staggered relation as in the leaves of the pin-strap. This enables different pairs of the rows 27 and 28 to be matched up and registered with different pairs of rows of the pin-strap. When the rows are matched together in this way the parts are connected by means of bolts (see Figure 7). If desired, in addition to the bolts 29, I provide a clamp or clip 30 (see Figure 8) to cooperate with the bolts in holding the leaves of the pin-strap closely against the side faces of the strap 31 (see Figure 7). This clamp is of flat rectangular form, and has a slot, that is to say, it has a slit 32 on one side which gives it resiliency and enables it to be slid over the end of the pin-strap; and if, desired, a similar clip 33 may be employed near the eye 21 for holding the leaves of the pin-strap near together in the vicinity of the pin 22.

In order to counterbalance the levers 7 and 12 I provide a coil spring 34 (see Figure 1). The lower end of this coil spring is attached to an anchor plate 35 on the bifurcated post 8, and the other end is attached to an offset or bent link, that extends around the pin 20 with its upper end connected by a pivot pin 37 to an offset bracket 38 which is secured to the side of the lever 7 near one of the journals 3.

This link 36 is bent into bow form so as to enable it to clear the wrist 5 when the lever 12 is in its elevated position. In this position the pull of the spring is nearly in line with the journals 3 so that it does not exert much of a turning moment on the lever system. However when rotation occurs on the journals 3 the upper end of the bracket 38 will move toward the left so as to bring the line of pull of the spring to the left of the axis of the journals 3, and this will enable the pull of the spring to have an effect in counterbalancing the levers.

It is understood that the embodiment of the invention described herein is only one of the many embodiments this invention may take, and I do not wish to be limited in the practice of the invention, nor in the claims, to the particular embodiment set forth.

What I claim is:—

1. In brake-apparatus, the combination of a brake band to frictionally engage a wheel, a tightener mounted to rotate on an axis and having a pair of wrists connected respectively to the ends of the brake-band, said tightener having an actuating arm extending therefrom, a brake lever with a bearing for supporting the same, and capable of applying the brake by manual force for either direction of rotation of the wheel, said brake-lever having a short arm extending away from the location of the tightener when the brake lever is in a position to tighten the band, and a link connecting the said short arm with the first named arm, said brake lever capable of completely controlling the brake for either direction of rotation of said wheel.

2. In brake-apparatus, the combination of a brake member to frictionally engage a wheel, a tightener, a floating support pivotally supporting said tightener enabling the same to rock in either direction on the same axis, said tightener having a pair of wrists connected respectively with the ends of the brake member, and a brake-lever for rotating the tightener to apply the brake.

3. In brake-apparatus, the combination of a brake member to frictionally engage a wheel, a tightener, a floating support pivotally supporting said tightener enabling the same to rock on its own axis, said tightener having a pair of wrists connected respectively with the ends of the brake member, and a brake lever rotatably mounted on the floating support and connected with the tightener to rock the same to apply the brake.

4. In brake-apparatus, the combination of a brake member to frictionally engage a wheel, a tightener, a floating support for said tightener enabling the same to rock on its own axis, said tightener having a pair of wrists connected respectively with the ends of the brake member, and a brake lever rotatably mounted on the floating support and connected with the tightener to rock the same and apply the brake, said brake lever having a short arm extending in a direction away from the location of the tightener when the brake lever is in a position to tighten the brake member, so that when the brake lever is depressed to the position where the brake member tightens, the tightener will be moved with a relatively low ratio of movement.

5. In brake-apparatus, the combination of a brake band to frictionally engage a wheel, a tightener, a floating support for said tightener having a relatively fixed pivotal support enabling the same to swing toward or from the face of the wheel, said floating support operating to support the tightener so as to rock on its own axis, said tightener having a pair of wrists connected respectively with the ends of the brake band, and a brake lever connected with the tightener to rock the same to apply the brake.

6. In brake-apparatus, the combination of a brake-member to frictionally engage a wheel, a movable tightener having two points of connection with the brake member, and mounted to rock so that when the tightener is moved on its axis, both ends of the brake member are moved, and a spring connected with the movable tightener for counterbalancing the brake-lever.

7. In brake-apparatus, the combination of a brake-band to frictionally engage a wheel, a tightener mounted to rotate on an axis and having two wrists connected respectively to the ends of the brake-band, a brake lever, and means connecting the brake-lever to the tightener, operating to move the tightener at a relatively high ratio of movement when the band is loose on the wheel, and a spring connected with the tightener for counterbalancing the brake-lever.

8. In brake-apparatus, the combination of a brake member to frictionally engage a wheel, a tightener, a floating support for said tightener enabling the same to rock on its own axis, said tightener having a pair of wrists connected respectively with the ends of the brake member, and a spring attached to the floating support at one end and connected at its other end with the tightener for counterbalancing the brake-lever.

9. In brake-apparatus, the combination of a brake band to frictionally engage a wheel, a tightener mounted to rotate on an axis and having a pair of wrists connected respectively to the ends of the brake-band, said tightener having an actuating arm extending therefrom, a brake lever with a bearing for supporting the same, said brake-lever having a short arm extending away from the location of the tightener when the brake lever is in a position to tighten the band, and a spring connected to the actuating arm for counterbalancing the weight of the brake-lever.

10. In a non-kicking brake for a reversible high speed wheel, the combination of a brake member wrapped on the wheel, a tightener for the brake member having a single, relatively fixed axis of rotation capable of moving toward or from the said wheel, and having two pivot-pins attached to the ends of the brake member, said tightner constructed so that when the tightner is moved, both ends of the brake member are taken up substantially equal amounts, and a brake lever limited in its swinging movement only by the brake member and connected with the tightner to operate the same.

11. In a non-kicking brake for a reversible high speed wheel, the combination of a brake member wrapped on the wheel, a tightner for the brake member having a single, relatively fixed axis of rotation, and having two pivot-pins attached to the ends of the brake member, the said pivot-pins and the wheel constituting the sole support for the brake member, said pins being located so that when the brake is in the "on" position the ends of the band extend past the said axis of rotation of the tightner, and said tightner constructed so that when the tightner is moved, both ends of the brake member are taken up substantially equal amounts, and a brake lever connected with the tightener to operate the same.

12. In a non-kicking brake for a reversible high speed wheel, the combination of a brake band wrapped on the wheel, a tightener for the brake band having a spindle with an axis of rotation capable of movement toward or from the wheel, said tightener having two crank arms forming an angle with each other substantially equal to the angle formed by the ends of the brake band, and having wrist pins attached respectively to the ends of the brake band, and a brake lever for rotating the tightener on the axis of said spindle.

13. In a non-kicking brake for a reversible high speed wheel, the combination of a brake band wrapped on the wheel, a tightener for the brake band having a spindle rotating on a single, relatively fixed axis of rotation, said tightener having two crank arms forming an angle with each other substantially equal to the angle formed by the ends of the brake band, and having wrist pins connected to the ends of the brake band, said tightener constructed so that when the tightener is rotated on the axis of said spindle, said crank arms and wrist pins, each wrist pin being located so that its corresponding end of the band extends past said axis of rotation whereby the rotation on said axis will tighten the band with a substantially equal "take-up" at each end of the band, and a brake lever connected with the tightener to operate the same.

14. In a non-kicking brake for a reversible high speed wheel, the combination of a brake band wrapped on the wheel, a rotary tightener mounted to rock on a single, relatively fixed axis and having a pair of wrist pins attached to the ends of the brake band and disposed so that the radius lines from the said axis to the said wrist pins form an angle with each other substantially equal to the angle formed by the ends of the brake band, each wrist pin being located so that its corresponding end of the band extends past the said axis of rotation of the tightener, and operating when the tightener is rocked on its axis to move both ends of the brake band substantially equal distances in a direction of pull substantially tangential to the brake wheel, and a brake lever connected with the tightener to actuate the same.

15. In a non-kicking brake for a reversible high speed wheel, the combination of a brake band wrapped on the wheel, a rotary tightener mounted to rock on an axis of rotation and having two wrist pins located at substantially equal distances from the said axis, said wrist pins and said wheel constituting the sole support for the said brake band, said wrist pins being each located so that its corresponding ends of the band extends past the said axis of rotation of the tightener and disposed so that the radius lines from the said axis to the said pins forms an angle substantially equal to the angle formed by the ends of the brake band, and operating so that the frictional pull in the brake band in both directions of rotation of the wheel, tends to rotate the tightener in the same direction, and a brake lever connected with the tightener to operate the same.

16. In brake apparatus for braking a wheel capable of moving laterally in its bearings, the combination of a brake band wrapped on the wheel, a tightener, a floating support for said tightener enabling the same to move toward or from the wheel to follow closely the movement of the wheel in case the same should move laterally in its bearings, said tightener having a pair of wrist pins connected respectively with the ends of the brake band, and a brake lever for rotating the tightener to apply the brake, said wheel and said wrist pins constituting the sole support for the brake band.

17. A brake apparatus for braking a rotating wheel capable of moving laterally in its bearings, the combination of a brake member to frictionally engage the wheel, a tightener, a floating support for said tightener enabling the same to follow closely the movement of the wheel if the same should move laterally in its bearings, said tightener having a pair of wrist pins connected respectively with the ends of the brake member, and a brake lever rotatably mounted on the floating support and connected with the tightener to rock the same to apply the brake.

18. In a non-kicking brake for a reversible high speed wheel, the combination of a brake member wrapped on the wheel, a tightener for the brake member having a single, relatively fixed axis of rotation and having two pivot pins attached to the ends of the brake member, said tightener having a spindle, the axis of which constitutes the said single fixed axis of rotation for the tightener, said pivot pins being located so that the radius lines from the axis of said spindle to the pivot pins form an angle substantially equal to the angle formed between the ends of the brake band, and a brake lever connected with the tightener to rock the same on the axis of its spindle.

19. In brake apparatus, the combination of a brake-band to frictionally engage a wheel, a tightener mounted to rotate on an axis and having wrists connected respectively to the ends of the brake-band, a shoe associated with the tightener between the ends of the band for engaging the face of the wheel, a brake-lever, and means connecting the brake-lever to the tightener.

20. In brake apparatus, the combination of a brake-band to frictionally engage a wheel, a tightener mounted to rotate on an axis and having wrists connected respectively to the ends of the brake-band, a shoe associated with the tightener between the ends of the band for engaging the face of the wheel, a brake-lever, and means connecting the brake-lever to the tightener, operating to move the tightener at a relatively high ratio of movement when the band is loose on the wheel and at a relatively low rate of movement when the band is tightened on the wheel.

21. In brake apparatus, the combination of a brake-member to frictionally engage a wheel, a tightener, a floating support for said tightener enabling the same to rock on its own axis, said tightener having wrists connected respectively with the ends of the brake-member, a brake shoe located between the tightener and the face of the wheel for engaging the face of the wheel, and a brake-lever rotatably mounted on the floating support and connected with the tightener to rock the same and apply the brake, said brake-lever having a short arm extending in a direction away from the location of the tightener when the brake-lever is in a position to tighten the brake-member so that when the brake-lever is depressed to the position where the brake-member tightens, the tightener will be moved with a relatively low ratio of movement.

22. In brake apparatus, the combination of a brake-band to frictionally engage a wheel, a tightener mounted to rotate on an axis, and having wrists connected respectively to the ends of the brake-band, a brake shoe located between the tightener and the wheel for engaging the face of the wheel, said tightener having an actuating arm extending therefrom, a brake-lever with a bearing for supporting the same, said brake-lever having a short arm extending away from the location of the tightener when the brake-lever is in a position to tighten the band, and a spring connected to the actuating arm for counter-balancing the weight of the brake-lever.

23. In a non-kicking brake for a reversible high-speed wheel, the combination of a brake-member wrapped on the wheel, a tightener for the brake-member having a single, relatively fixed axis of rotation, and having two pivot pins attached to the ends of the brake-member, a brake shoe between the tightener and the wheel for engaging the wheel, said tightener constructed so that when the tightener is moved both ends of the brake-member are taken up substantially equal amounts.

24. In a non-kicking brake for a reversible high-speed wheel, the combination of a brake-member wrapped on the wheel, a tightener for the brake-member having a single, relatively fixed axis of rotation, and having two pivot pins attached to the ends of the brake-member, a brake shoe between the tightener and the wheel for engaging the wheel, said tightener constructed so that when the tightener is moved both ends of the brake-member are taken up substantially equal amounts, and a brake-lever limited in its swinging movement only by the brake-member, and connected with the tightener to operate the same.

25. In brake apparatus, the combination of a brake-band to frictionally engage a wheel, tightener cranks, a support for said tightener cranks capable of moving toward or from the face of the wheel, a shoe interposed between the tightener cranks and the wheel to engage the face of the wheel and limit movement of the tightener cranks toward the wheel, said support operating to permit the tightener cranks to rock and operate simultaneously, said tightener cranks connected respectively with the ends of the brake band and operating so that when the tightener cranks are moved, both ends of the brake-member are taken up substantially equal amounts, and a brake-lever connected with the tightener cranks to operate the same.

26. In brake apparatus, the combination of a brake-band to frictionally engage a wheel, a tightener having wrists, a support for said tightener, a shoe interposed between the tightener and the wheel for engaging the face of the wheel, said tightener wrists connected respectively with the ends of the brake-band and constructed so that when the tightener wrists are operated both ends of the brake-member are taken up substantially equal amounts, and a brake-lever connected with the tightener to operate the same.

27. In brake apparatus, the combination of a brake band to frictionally engage a wheel, tightener cranks, a support for said tightener cranks, said support capable of movement toward or away from the brake wheel and operating to support the tightener cranks to rock and operate simultaneously, said tightener cranks connected respectively with the ends of the brake band and operating so that when the tightener cranks are moved both ends of the brake member are taken up substantially equal amounts, and brake levers connected with the cranks to operate the same.

Signed at Bakersfield, California, this 17th day of June, 1926.

LEROY G. GATES.